United States Patent [19]
Gipp et al.

[11] Patent Number: 5,215,033
[45] Date of Patent: Jun. 1, 1993

[54] FLEXIBLE BOUNDARY MARKER

[75] Inventors: Gregg Gipp, Chester Springs; Robert McDade, Downingtown, both of Pa.

[73] Assignee: Cartrol Enterprises, Inc., St. Davids, Pa.

[21] Appl. No.: 832,438

[22] Filed: Feb. 7, 1992

[51] Int. Cl.⁵ .................... G01C 15/04; G09F 17/00
[52] U.S. Cl. ................................... 116/209; 116/173
[58] Field of Search ............... 40/608; 52/103, 105; 116/173, 174, 175, 209; 248/545; 404/10, 11; 403/229

[56] References Cited

U.S. PATENT DOCUMENTS

| | | | |
|---|---|---|---|
| 1,013,410 | 1/1912 | Lynch | 403/229 |
| 1,135,372 | 4/1915 | Gibson | 116/173 X |
| 3,138,249 | 6/1964 | Paulini | 116/173 X |
| 3,267,901 | 8/1966 | Carroll | 116/209 |
| 3,279,133 | 10/1966 | De Korte | 52/103 |
| 3,903,835 | 9/1975 | Carroll | 116/200 X |
| 4,343,567 | 8/1982 | Sarver et al. | 116/209 X |
| 4,862,823 | 9/1989 | Hughes | 116/209 |
| 5,040,478 | 8/1991 | Hughes | 116/209 |
| 5,174,237 | 12/1992 | Beard | 116/209 |

FOREIGN PATENT DOCUMENTS

0019486 of 1909 United Kingdom ................ 116/173

*Primary Examiner*—William A. Cuchlinski, Jr.
*Assistant Examiner*—W. Morris Worth
*Attorney, Agent, or Firm*—Panitch Schwarze Jacobs & Nadel

[57] ABSTRACT

A flexible, visual boundary marker is provided for delineating surface boundaries and allowing unobstructed transgression of the boundary. The marker of the present invention is particularly useful on a golf course since the marker can be run over by either reel or rotary type lawn mowers without sustaining permanent damage. In this manner the turf immediately adjacent the marker can be maintained without the need to temporarily remove the marker or to maintain the adjacent turf with an additional hand tool. The marker has a highly prominent flag fixed to an elongated post which stands vertically in a free-standing orientation, flexes to a horizontal orientation when contacted by a surface maintenance vehicle such as a lawn mower, and which returns to a vertical free-standing position after the vehicle has transgressed the marker. The marker resists permanent damage, even from commercial reel or rotary lawn mowers, due to the dimensions and flexibility of the marker.

36 Claims, 2 Drawing Sheets

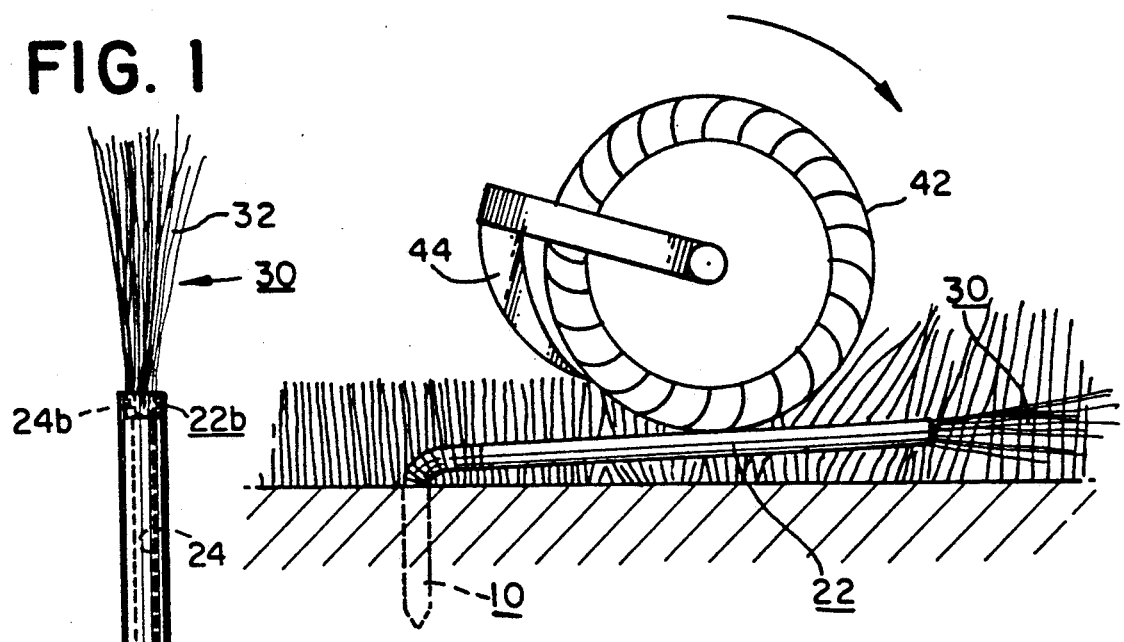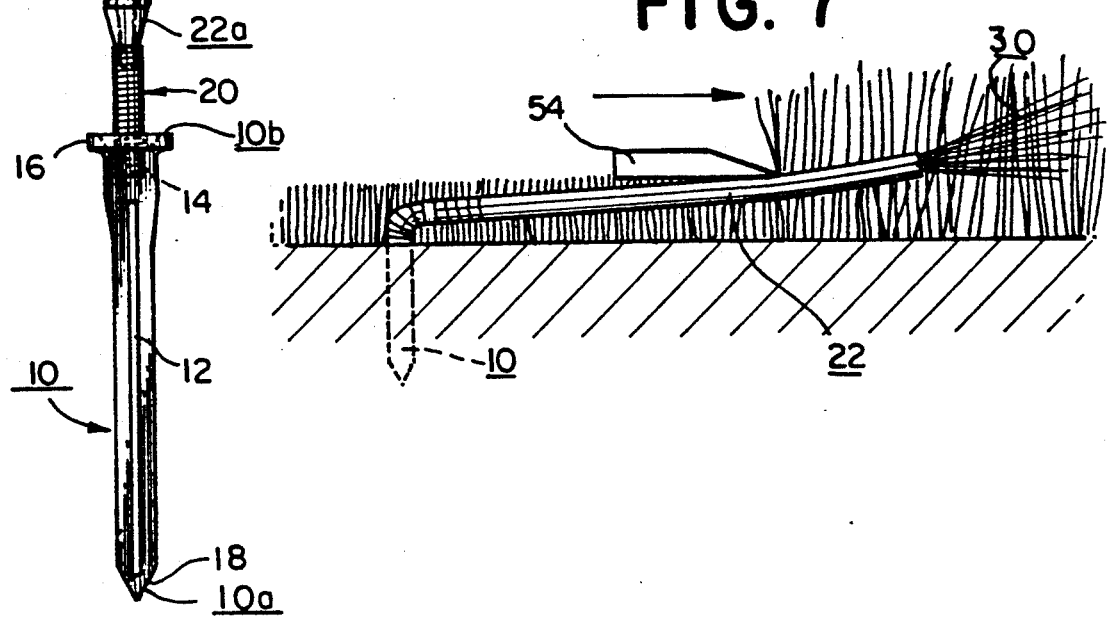

ated location on the golf course. A flexible post is attached at one end to the base by means of a spring which allows the post to be moved universally above ground independently of the base. For high visibility a flag is attached to the other end of the post.

FLEXIBLE BOUNDARY MARKER

FIELD OF THE INVENTION

The present invention relates to flexible, visual surface markers for delineating various areas on a golf course and which need not be removed during maintenance of the turf immediately adjacent the marker. In particular, the markers of the present invention can be "run over" by maintenance equipment without incurring permanent damage.

BACKGROUND OF THE INVENTION

On any private or public golf course certain areas need to be delineated. Some areas requiring delineation include: the playing course bounds; hazards or construction on the course; and, the desired golf cart traffic pattern. On an average eighteen-hole golf course, hundreds of ground markers are needed for the above-mentioned reasons. Groundskeepers must regularly mow the turf immediately adjacent all obstacles, including ground markers, to maintain the aesthetic appearance of the golf course and to prevent lost visibility of the markers due to overgrowth.

The two types of lawn mowers most commonly used on golf courses include commercial reel mowers and commercial rotary mowers. Commercial rotary mowers are similar to residential gas- or electrically-powered push mowers except that commercial rotary mowers typically comprise several adjacently-mounted rotating blades in a single housing to achieve a wider swath. By using a rotary mower the turf is cut by the shear speed of the tip of the rotating blade. Commercial reel mowers typically comprise several adjacently mounted cutting reels which impinge grass on a cutter bar in a manner similar to a pair of scissors.

While each type of mower is better suited for particular areas of the golf course, neither mower can effectively cut the grass immediately adjacent any obstacle such as trees or boundary markers. To properly maintain the grass immediately adjacent immovable obstacles on the course, groundskeepers must use, for example, additional tools such as hand sheers or power grass trimmers. To properly maintain the grass immediately adjacent movable obstacles on the course, such as boundary markers, groundskeepers obviously have the additional option of moving the obstacle and cutting the grass with one of the aforementioned lawn mowers. Thus, maintaining the turf immediately adjacent conventional course markers requires the expenditure of additional labor and machinery, and is very time consuming considering the number of markers on every golf course.

SUMMARY OF THE INVENTION

The present invention provides a visual surface boundary marker which provides high visibility and can be run over with a reel lawn mower or rotary lawn mower without sustaining permanent damage to the marker.

The course markers of the present invention enable the golf course to be maintained more efficiently since the marker need not be removed to mow the turf immediately adjacent the marker; nor does the maintenance need to be performed by a separate grass cutting tool operated by an additional groundskeeper.

The marker comprises a base which is inserted into the surface for anchoring the marker securely at a predetermined location on the golf course. A flexible post is attached at one end to the base by means of a spring which allows the post to be moved universally above ground independently of the base. For high visibility a flag is attached to the other end of the post.

To cut the grass immediately adjacent the markers more efficiently, the markers can simply be run over by the lawn mower. The marker has a height and flexibility which resists permanent damage by the mower blades eliminating the time consuming job of removing every marker or cutting the grass immediately adjacent the marker by hand.

BRIEF DESCRIPTION OF THE DRAWINGS

The objects of the invention are more fully set forth hereinafter, with reference to the accompanying drawings, wherein:

FIG. 1 is a side elevational view of a boundary marker according to the present invention having a fragmented base for ease of illustration;

FIGS. 4 is an enlarged diagrammatic view illustrating the cutting reel and cutting bar of a reel lawn mower running over a boundary marker of the present invention;

FIG. 7 is an enlarged diagrammatic view illustrating the cutting blade of a rotary lawn mower cutting grass and striking a boundary marker of the present invention.

DESCRIPTION OF A PREFERRED EMBODIMENT

Figure 2:
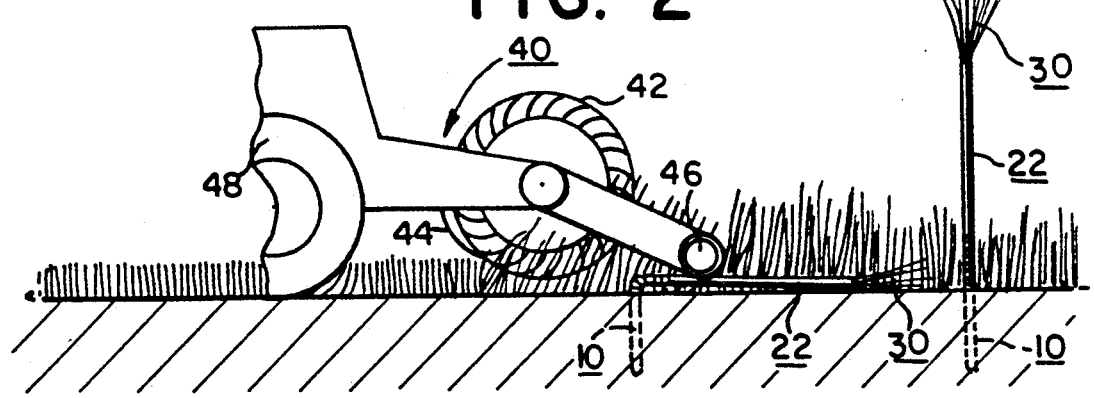
FIGS. 2 and 3 are diagrammatic views of a reel lawn mower approaching and running over a series of boundary markers according to the present invention.

As illustrated in FIG. 1, a boundary marker according to the present invention comprises an elongated, cylindrical base, denoted generally by reference number 10, having opposed ends, which is inserted into the surface of the area to be defined. The base 10 has a pointed surface 18, such as a tapered conical surface, at a subsurface end 10a for penetrating easily into the boundary surface and ribs 12 protruding radially from the base 10 and running generally along the entire length of the base 10. The ribs 12 increase the surface area of the base which helps to secure the base more firmly in the ground.

The base 10 has a flange 16 and an axial bore 14 at a surface end 10b. The flange 16 provides a wider drive surface for displacing the marker base axially into the surface with one's hand or foot. The flange also provides a clenching surface which facilitates removal of the base when it is desired to relocate the markers, for example to change the delineation of the course or the cart paths.

The axial bore 14 is designed to receive one end of a flexible connector such as an extension spring 20 which supports a post 22 in a substantially vertical position relative to the connector base 10. The spring is designed to allow universal movement of the post relative to the base upon application of an external force by deflecting the post from its normal orientation. Upon removal of the external force, the bias of the spring returns the post to a substantially vertical position. Preferably the bore is dimensioned relative to the diameter of the spring to provide a force fit when the spring 20 is inserted into the bore 14 sufficient to prevent inadvertent disengagement of the post from the spring.

The dimensions of the connector or spring are chosen to provide a predetermined flex height measured from the surface end of the base to the highest projection of the connector when the post is in a substantially horizontal orientation. It is important that the flex height be less than the height of the action path of either a rotary or reel lawn mower. Additionally, the projection of the flange above the surface plus the flex height of the connector must be less than the height of the action path of the mower since the flange may not be displaced flush with the surface. The heights of the action path of a reel and rotary mower are the heights of the cutting bar 44 and the rotating blade 54, respectively, i.e., the height of the freshly mowed turf.

In accordance with the aforementioned important design considerations, the spring preferably has a predetermined length of approximately 2 inches, which is selected to an outside diameter of approximately $\frac{3}{8}$ inches, and is made of approximately 1/18 in. diameter stainless wire. Preferably, the bore 14 is tapered at the end adjacent the flange 16 to allow the spring 20 to bend further into a horizontal configuration. The flange has an outer dimension approximately twice the diameter as the base and is preferably approximately $\frac{1}{8}''$ thick.

The post 22 of the marker is elongated, having opposed ends 22a and 22b. One end 22a of the post 22 is secured to the end of the spring 20 which protrudes from the base 10. Preferably one end of the post 22a is dimensioned relative to the inner diameter of spring to provide a force fit sufficient to anchor the post in the spring 20 when the tapered end 22a of the post 22 is inserted into the spring 20. The post preferably has a predetermined length in the range of approximately 10-15 inches and has an outer diameter in the range of approximately 3/16-$\frac{1}{2}$ inches. If the outer diameter of the post is greater than the inner diameter of the preferred spring, one end 22a of the post may be tapered, as seen in FIG. 1, for force fitting the post into the spring 20.

For greater prominence, a flag, denoted generally by reference number 30, is attached to the other end 22b of the post 22, and is designed to avoid being damaged when run over by the mower. Preferably the flag 30 comprises a bundle of elongated plastic filaments 32 which are tightly bunched at one end and affixed to the post 22 and which fan out at the other end for greater visibility. Preferably, the bunched end of the plastic filaments 32 are forcefully inserted into an axial bore 24b at the other end 22b of the post. While the post preferably has an axial bore 24 running the length of the post for greater flexibility, the diameter of bore 24b near the other end of the post 22b is preferably enlarged to accommodate a greater number of plastic filaments 32 as seen in FIG. 1. For increased security, the filaments may be treated with an adhesive at one end before being inserted into the bore 24b on the post 22.

While the elements comprising the marker may be made of a number of different materials, it is preferred that the base be made of PVC pipe, the spring made of stainless steel, the post made of PVC tubing, and the flag made of polypropylene bristles. Preferably the post and flag are colored brightly for higher visibility.

Figure 3:
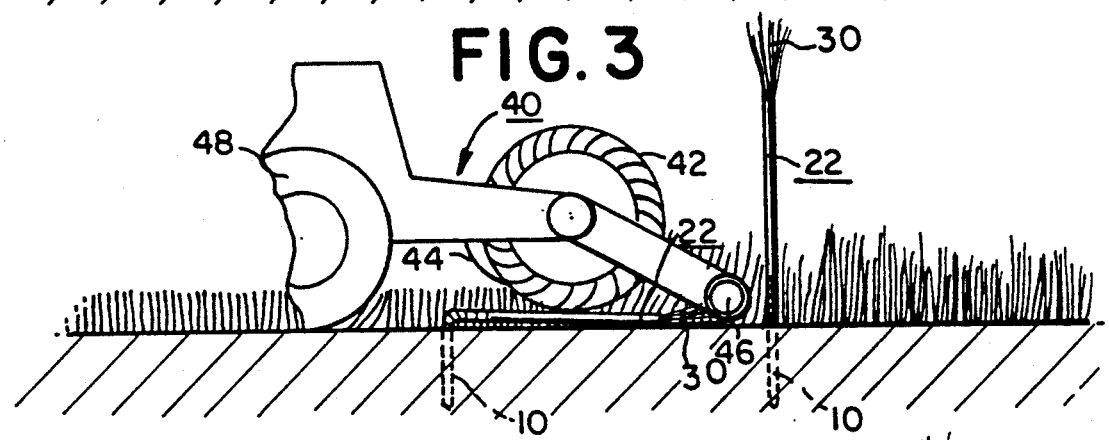

The overall length and the flexibility of the post and flag contribute to the marker's ability to resist damage when run over by lawn maintenance machinery including either reel or rotary lawn mowers. For example, FIGS. 2-4 illustrate the boundary marker's resistance to damage by a reel lawn mower, denoted generally by reference number 40. As the lawn mower 40 approaches a marker according to the present invention, the support roller 46 contacts the post and bends the marker 10 down into a substantially horizontal position. As the lawn mower 40 continues travel over the marker 10, the dimensions of the spring and post assure that contact with the marker is continued by the mower reel 42 without permitting these elements to enter between the bar 44 and the reel 42. The reel cuts the turf immediately adjacent the marker but does not cut the post because the post does not become impinged between the cutting bar 44 and the reel 42. The reel is incapable of cutting anything independently of the cutter bar 44. After the lawn mower 40 has passed over the marker, the bias of spring returns the marker to a substantially vertical position.

Figure 5:
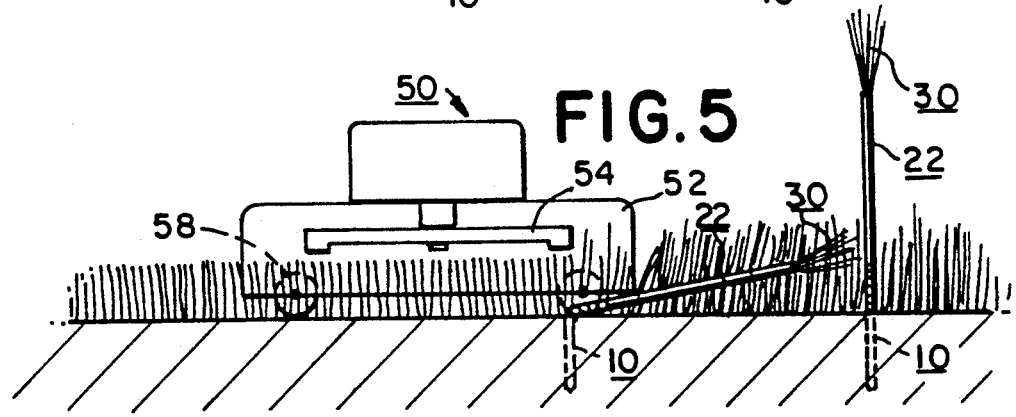
FIGS. 5 and 6 are diagrammatic views illustrating a rotary lawn mower approaching and running over a series of boundary markers according to the present invention.
Figure 6:
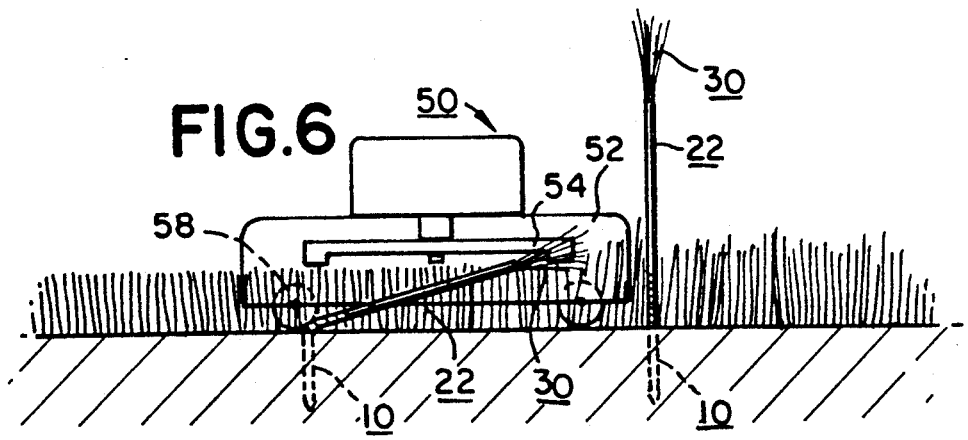

FIGS. 5-7 illustrate the boundary marker's resistance to damage by a rotary lawn mower, denoted generally by reference number 50. The dimensions of the spring and post assure that as the lawn mower 50 approaches a marker according to the present invention, the leading edge of the lawn mower housing 52 contacts the marker and bends the marker down into a substantially horizontal position. As the lawn mower continues to travel over the marker, the marker comes into contact with the tip of the cutting blade 54. Neither the post 22 nor the flag 30 are cut by the blade due to the flexibility of the marker and very small angle of incidence. As best seen in FIG. 7, the tip of the cutting blade cannot shear the post or flag like the adjacent grass due to the very small contact angle. The post 22 and flag filaments 32 can flex to absorb the impact energy of the cutting blade without incurring permanent damage. After the lawn mower 50 has passed over the marker, the marker springs back into a substantially vertical position and regains its original orientation.

It should be appreciated that contact between either the cutting reel 42 or the rotary blade 54 may cause superficial surface wear to the post or flag. The marker, however, does not sustain significant permanent damage such that the marker's effectiveness is compromised.

Boundary markers according to the present invention can be used to replace wooden, plastic or metal stakes that are painted and driven into the playing surface to delineate the playing bounds of the course. The aforementioned boundary markers can also be used to replace ropes, painted lines or cart signs to delineate the desired cart traffic pattern within the playing bounds of the course. The present boundary markers also provide much greater visibility over markers which are designed close enough to the ground surface to be unaffected by lawn maintenance machinery.

Since the boundary markers of the present invention are not damaged when run over by either a reel or rotary lawn mower, the markers need not be removed each time the surface requires maintenance. This feature can save hundreds of work hours since an average eighteen-hole golf course utilizes hundreds of visual markers. The boundary markers of the present invention also avoid interference with play of the game since the dimensioning of the spring and post assure that the post may be readily flexed in the event of inadvertent contact by a golf ball, a golf club or any other instrument used in the play of the game.

For markers used to delineate the playing bounds of the course, for greater prominence the diameter and length of the post should be selected from the upper range of dimensions to make the post more visible and to accommodate a greater number of plastic filaments 32 affixed to the post 22. A marker embodying a post with an enlarged diameter approximately equal to ½ inches and enlarged length approximately equal to 15 inches, would preferably have a tapered end to be received by the same size spring as a marker having a post with a smaller diameter. While an enlarged post has greater visibility, its increased diameter results in reduced flexibility which makes the post susceptible to damage when run over completely by a rotary mower; however, the marker's resistance to damage when run over by a reel mower is unaffected by an enlarged post.

A marker having an enlarged post is still useful for providing easy access to the adjacent turf with a rotary mower. As illustrated in FIG. 5, such a marker can be partially run over to a limit point by a rotary lawn mower without incurring permanent damage. The rotary mower must not transgress the marker beyond a point where the marker is completely enshrouded within the housing of the lawn mower as illustrated in FIG. 6. A portion of the post must extend outwardly beyond the edge of the housing. Therefore, to maintain the turf immediately adjacent the marker, a groundskeeper must push down the marker with the lawn mower or another implement and continue its path of travel to a position in which the cutting blade passes over the turf immediately adjacent the base 10 of the marker. The groundskeeper must then control the travel of the lawn mower so that the marker does not become completely enshrouded within the lawn mower housing as illustrated in FIG. 6.

For markers used within the playing bounds of the course, the diameter and length of the post 22 should be selected from the lower end of the range of dimensions. In such case, the post has sufficient flexibility to avoid damage when run over completely by either a reel or a rotary mower, and yet exhibits sufficient visibility to serve its purpose.

It should also be appreciated that the marker is not damaged when run over by the wheels 48 and 58 of a lawn maintenance vehicle which may or may not have cutting elements. The invention provides a visual boundary marker which is easily movable and resists damage if transgressed by the vehicle.

It should be appreciated that while a particular embodiment of a boundary marker of the present invention has been illustrated and described in reference to use on a golf course, it is not intended to limit the invention to such disclosures. Changes and modifications may be made to a marker in accordance with the present invention for areas in which conventional surface boundary markers may incur damage by maintenance or other vehicles which regularly travel over the surface delineated by the markers such as at construction sights, all within the scope of the following claims.

We claim:

1. A flexible, visual boundary marker for delineating surface boundaries on a golf course on which a reel lawn mower is utilized, said reel mower having a cutting reel which impinges turf on a cutting bar which defines the height of the action path of the reel mower, said marker affording access of the reel lawn mower to the turf immediately adjacent said marker without necessitating removal of said marker, said marker comprising:

a base, having a surface end and a subsurface end, constructed and arranged to be easily displaced into the surface for anchoring said marker, and having a bore in said surface end;

an elongated post having top and bottom ends and a predetermined length;

a universal flexible connector having first and second ends mounting said post at one end to the surface end of said base for supporting said post in a substantially vertical orientation relative to said base, the first end of the flexible connector being inserted within the bore in the base to attach the connector to the base, the connector projecting outwardly from the surface end of the base with the second end of the connector being attached at the bottom end of the post, said connector constructed and arranged to allow universal movement of said post to a substantially horizontal limit orientation relative to the surface upon application of an external force, and to return said post to a substantially vertical orientation upon removal of the external force, said flexible connector constructed and arranged to flex at the surface end of said base with a predetermined flex height measured from said surface end of said base to the highest projection of said flexible connector when said post is oriented substantially horizontally, said flex height being less than the height of the action path of the mower; and said marker being constructed and arranged to withstand permanent damage when in its horizontal limit orientation and run over by said reel lawn mower.

2. A boundary marker according to claim 1 wherein said subsurface end of said base has a pointed surface and said surface end has a flange for providing an enlarged drive surface for easily displacing said base of said marker into the surface and an enlarged clenching surface for easily extracting said base from the surface.

3. A boundary marker according to claim 2 wherein the projection of said flange above the surface plus the flex length of said connector is less than the height of the action path of the mower.

4. A boundary marker according to claim 1 wherein said base has ribs fixed to and protruding outwardly from the surface of said base for providing increased surface area for anchoring said base.

5. A boundary marker according to claim 1 wherein said connector comprises a tensioning spring.

6. A boundary marker according to claim 1 wherein said predetermined length of said post is of sufficient length such that said marker does not become impinged between the cutting bar and the reel of the lawn mower.

7. A flexible, visual boundary marker for delineating surface boundaries on a golf course on which a rotary mower is utilized, said mower having a rotating cutting blade which shears turf, the cutting blade defining the height of the action path of the rotary mower, said marker affording access of the rotary lawn mower to the turf immediately adjacent said marker without necessitating removal of said marker, said marker comprising:

a base, having a surface end and a subsurface end, constructed and arranged to be easily displaced into the surface for anchoring said marker, and having a bore in said surface end;

an elongated post having top and bottom ends and a predetermined length;

a universal flexible connector having first and second ends mounting said post at one end to the surface end of said base for supporting said post in a substantially vertical orientation relative to said base, the first end of the flexible connector being inserted within the bore in the base to attach the connector to the base, the connector projecting outwardly from the surface end of the base with the second end of the connector being attached at the bottom end of the post, said connector constructed and arranged to allow universal movement of said post to a substantially horizontal limit orientation relative to the surface upon application of an external force, and to return said post to a substantially vertical orientation upon removal of the external force, said flexible connector constructed and arranged to flex at the surface end of said base with a predetermined flex height measured from said surface end of said base to the highest projection of said flexible connector when said post is oriented substantially horizontally, said flex height being less than the height of the action path of the mower; and said marker being constructed and arranged to withstand permanent damage when run over by said rotary mower.

8. A boundary marker according to claim 7, said subsurface end of said base has a pointed surface and said surface end has a flange for providing an enlarged drive surface for easily displacing said base of said marker into the surface and an enlarged clenching surface for easily extracting said base from the surface.

9. A boundary marker according to claim 7 wherein said connector comprises a tensioning spring.

10. A boundary marker according to claim 7 wherein said base has ribs fixed to and protruding outwardly from the surface of said base for providing increased surface area for anchoring said base.

11. A boundary marker according to claim 7 wherein said predetermined length of said post is of sufficient length such that when the rotary mower contacts the marker the angle of incidence between the rotary cutting blade and said post is small enough to prevent shearing of said post.

12. A boundary marker according to claim 7 wherein said post comprises a material of sufficient resiliency such that said post extends in a substantially vertical orientation when said marker is free-standing but flexes to absorb the impact energy of a rotary cutting blade and to resist permanent damage to said post.

13. A boundary marker according to claim 7 wherein said marker includes a flag attached to the top end of the post to provide high prominence to the marker, said flag comprising a material of sufficient resiliency such that said flag extends in a substantially vertical orientation when said marker is free-standing but flexes to absorb the impact energy of a rotary cutting blade and to resist permanent damage to said flag.

14. A flexible, visual boundary marker for delineating surface boundaries, said marker providing unobstructed transgression of the boundaries without necessitating removal of said marker, said marker comprising:

a base for anchoring said marker having a surface end and a subsurface end, and having a bore in said surface end, said subsurface end having a pointed surface and said surface and having a flange for providing an enlarged surface for easily displacing said base of said marker into the surface for anchoring said marker;

an elongated post having top and bottom ends and a predetermined length, a universal flexible connector having first and second ends flexibly mounting said post at one end to said base for supporting said post in a substantially vertical orientation relative to said base, the first end of the flexible connector being inserted within the bore in the base to attach the connector to the base, the connector projecting outwardly from the surface end of the base with the second end of the connector being attached at the bottom end of the post, said connector constructed and arranged to flex at the surface end of said base to allow universal movement of said post to a substantially horizontal limit orientation relative to the surface upon application of an external force, and to return said post to a substantially vertical orientation upon removal of the external force; and said marker being constructed and arranged to withstand permanent damage when transgressed by a surface vehicle.

15. A boundary marker according to claim 14 wherein said base comprises ribs fixed to and protruding outwardly from the surface of said base for providing increased surface area for anchoring said base.

16. A boundary marker according to claim 15 wherein said connector comprises a tensioning spring.

17. A boundary marker according to claim 16 for use with a mower having cutting elements adapted to be rotated to mow turf with predetermined height above the surface, wherein the projection of said connector above the surface when said post is in said substantially horizontal orientation is below the predetermined height of the turf.

18. A flexible, visual marker for insertion into the ground to mark a selected position on ground surface comprising:

(a) a base for anchoring said marker in the ground having a surface end and a subsurface end, said subsurface end having a pointed surface for insertion into the ground and said surface end having a flange for providing an enlarged surface for easily displacing said base of said marker into the ground for anchoring said marker, said base having an exposed bore at the surface end;

(b) an elongated post having a top end and a bottom end; and (c) a flexible universal connector having first and second ends for flexibly mounting said post at the bottom end to said base for supporting said post in a substantially vertical orientation relative to said base, the first end of the flexible connector being inserted within the bore in the base to attach the connector to the base, the connector projecting outwardly from the surface end of the base with the second end of the flexible connector being attached at the bottom end of the post, said universal connector constructed and arranged to flex at the surface end of the base to allow universal movement of said post to a substantially horizontal limit orientation relative to the ground surface upon application of an external force, and to return said post to a substantially vertical orientation upon removal of the external force.

19. The marker in accordance with claim 18 wherein said base comprises ribs fixed to and protruding outwardly from said base for providing increased surface area for anchoring said base.

20. The marker in accordance with claim 19 wherein said connector comprises a tensioning spring.

21. The marker in accordance with claim 20 wherein the tensioning spring comprises a coil spring.

22. The marker in accordance with claim 20 for use with a mower having cutting elements adapted to be rotated to mow turf to a predetermined height above the ground surface, wherein projection of said connector above the ground surface when said post is in said substantially horizontal orientation is below the predetermined height of the turf.

23. The marker in accordance with claim 18 comprising a flag attached at the top end of the post to provide high prominence to the marker.

24. The marker in accordance with claim 23 wherein the post includes an axial bore at the top end of the post and wherein the flag comprises a bundle of filaments bunched at one end for insertion into the axial bore of the post to attach the filaments to the top end of the post.

25. The marker in accordance with claim 18 wherein the bore in the base is tapered at the surface end to provide clearance between the base and the connector at the surface end of the base to facilitate bending of the connector toward the horizontal orientation.

26. The marker in accordance with claim 18 wherein the bore in the base is dimensioned relative to the first end of the connector to provide a force fit sufficient to prevent inadvertent disengagement of the connector from the base when the first end of the connector is inserted into the bore in the base.

27. The marker in accordance with claim 26 wherein the connector includes a passage at least at the second end of the connector and wherein the bottom end of the post is inserted into the passage at the second end of the connector to attach the post to the second end of the connector.

28. The marker in accordance with claim 27 wherein the passage at the second end of the connector is dimensioned relative to the bottom end of the post to provide a force fit sufficient to anchor the post in the connector when the bottom end of the post is inserted into the passage at the second end of the connector.

29. The marker in accordance with claim 28 wherein the bottom end of the post is tapered to facilitate insertion into the passage at the second end of the connector.

30. The marker in accordance with claim 18 wherein the connector includes a passage at least at the second end of the connector and wherein the bottom end of the post is inserted into the passage at the second end of the connector to attach the post to the second end of the connector.

31. The marker in accordance with claim 30 wherein the passage at the second end of the connector is dimensioned relative to the bottom end of the post to provide a force fit sufficient to anchor the post in the connector when the bottom end of the post is inserted into the passage at the second end of the connector.

32. The marker in accordance with claim 31 wherein the bottom end of the post is tapered to facilitate insertion into the passage at the second end of the connector.

33. A flexible, visual marker for insertion into the ground to mark a selected position on ground surface comprising:
  (a) a base for anchoring said marker in the ground having a surface end and a subsurface end, said subsurface end having a pointed surface for insertion into the ground, said base having an exposed bore at the surface end;
  (b) an elongated post having a top end and a bottom end; and
  (c) a flexible universal connector having first and second ends for flexibly mounting said post at the bottom end to said base for supporting said post in a substantially vertical orientation relative to said base, the first end of the flexible connector being inserted within the bore in the base to attach the connector to the base, the connector projecting outwardly from the surface end of the base with the second end of the flexible connector being attached at the bottom end of the post, said universal connector constructed and arranged to flex at the surface end of the base to allow universal movement of said post to a substantially horizontal limit orientation relative to the ground surface upon application of an external force, and to return said post to a substantially vertical orientation upon removal of the external force.

34. A marker in accordance with claim 33 wherein said surface end of said base includes a flange for providing an enlarged surface for easily displacing said base of said marker into the ground for anchoring said marker and wherein the post includes an axial bore at the top end of the post and wherein the marker includes a flag attached at the top end of the post to provide high prominence to the marker, the flag comprising a bundle of filaments bunched at one end for insertion into the axial bore at the top end of the post to attach the filaments to the top end of the post and wherein the connector includes a tensioning spring providing a passage at least at the second end of the connector and wherein the bottom end of the post is inserted into the passage to attach the post to the second end of the connector.

35. The marker in accordance with claim 34 wherein the bore in the base is dimensioned relative to the first end of the connector to provide a force fit sufficient to prevent inadvertent disengagement of the connector from the base when the first end of the connector is inserted into the bore in the base and wherein the passage at the second end of the connector is dimensioned relative to the bottom end of the post to provide a force fit sufficient to anchor the post in the connector when the bottom end of the post is inserted into the passage at the second end of the connector and wherein the bottom end of the post is tapered to facilitate insertion of the bottom end of the post into the passage at the second end of the connector.

36. The marker in accordance with claim 33 wherein the bore in the base is tapered at the surface end to provide clearance between the base and the connector at the surface end of the base to facilitate bending of the connector toward the horizontal orientation.

* * * * *